US006412172B1

(12) United States Patent
Kestner et al.

(10) Patent No.: US 6,412,172 B1
(45) Date of Patent: Jul. 2, 2002

(54) METHOD OF MAKING DUAL PHASE GRAPHITE CYLINDER LINER

(75) Inventors: Michael A. Kestner, Spring Lake; Thomas J. Smith, Muskegon, both of MI (US); Anthony Angilella, Richmond, ID (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/962,875

(22) Filed: Sep. 25, 2001

Related U.S. Application Data

(62) Division of application No. 09/685,576, filed on Oct. 11, 2000, now Pat. No. 6,318,330.

(51) Int. Cl.[7] .................................................. B23P 15/00

(52) U.S. Cl. ................................ 29/888.061; 29/527.4; 164/114

(58) Field of Search ........................ 29/888.061, 888.06, 29/527.4; 123/193.1, 193.2, 193.3; 164/114

(56) References Cited

U.S. PATENT DOCUMENTS

| | | | | |
|---|---|---|---|---|
| 3,439,586 A | | 4/1969 | Holtan et al. | 92/169 |
| 3,938,814 A | * | 2/1976 | Cromwell | 277/444 |
| 4,017,708 A | | 4/1977 | Engel et al. | 219/121 |
| 4,124,056 A | * | 11/1978 | Noble | 164/114 |
| 4,447,275 A | | 5/1984 | Hiraoka et al. | 148/152 |
| 4,553,472 A | * | 11/1985 | Munro et al. | 92/176 |
| 5,370,170 A | * | 12/1994 | Sander et al. | 164/122.1 |
| 6,280,796 B1 | * | 8/2001 | Kloft et al. | 427/331 |
| 2001/0044352 A1 | * | 11/2001 | Korenjak et al. | 474/101 |

* cited by examiner

*Primary Examiner*—I Cuda Rosenbaum
(74) *Attorney, Agent, or Firm*—Rader, Fishman & Grauer PLLC

(57) ABSTRACT

An inventive cylinder liner of the present invention includes a dual phase graphite morphology. An outer diameter of the cylinder liner is comprised of ductile (nodular) and vermicular iron while an inner diameter of the cylinder liner is comprised of predominantly gray iron. A transition region of predominantly vermicular iron is preferably disposed between the inner diameter and the outer diameter. The inventive cylinder is preferably made using a centrifugal casting process, which provides a transition in the cylinder wall between the ductile and vermicular iron at the outer diameter to the predominantly gray iron at the inner diameter.

20 Claims, 1 Drawing Sheet

METHOD OF MAKING DUAL PHASE GRAPHITE CYLINDER LINER

CROSS-REFERENCE TO RELATED APPLICATION

This application is a divisional of U.S. Application No. 09/685,576 filed on Oct. 11, 2000, now U.S. Pat. No. 6,318,330 issued on Nov. 20, 2001, which is herein incorporated by reference in its entirety and for all purposes.

FIELD OF THE INVENTION

The present invention relates to a cylinder liner, and more particularly to a cylinder liner having a dual-phase graphite morphology of nodular (ductile) and vermicular iron comprising the outer diameter of the liner, and a gray and vermicular iron comprising the inner diameter of the liner, and a method of making the same.

BACKGROUND OF THE INVENTION

Cylinder liners are known in the art and are used in various internal combustion engines such as diesel engines. Generally, cylinder liners are inserted or cast into a bore of a cylinder block of an engine. Cylinder liners are typically adapted for receiving a piston with associated piston rings that move reciprocatingly within the cylinder liner. Accordingly, cylinder liners are subjected to great stresses such as heat and friction that may cause them to wear, crack and break.

However, it is important that cylinder liners provide high strength, high rigidity and high dimensional stability while also exhibiting desirable sliding characteristics with respect to any opponent sliding members such as piston rings. Known cylinder liners have been comprised of various materials such as cast iron and reinforced light metals. To reduce wearing, cracking and breakage, some liners have been coated with heat and wear resistant materials. Other liners have been heat treated by electrical induction devices, which surface hardens the portion of the liner that experiences piston wear or through hardened to provide strength and wear resistance. Yet other liners have been roll burnished, reinforced with various materials such as a ceramic matrix, or alloyed to produce a structure such as bainite or steadite to improve wear resistance.

However, the problems of wearing, cracking, and breaking of cylinder liners remain. Particularly, wherever there is a sharp comer transition from one surface of the liner to another, such as at the liner's flange to wall transition (e.g. a notch), breaking and cracking are common. Further, the materials and methods used to reduce wearing, cracking and breaking of cylinder liners are quite expensive.

Therefore, there is a need for a cylinder liner with improved wear, crack, and breakage resistance, and that can be manufactured cost-efficiently.

SUMMARY OF THE INVENTION

The present invention is directed to an iron cylinder liner whereby the cylinder liner has a dual phase graphite morphology. The outer diameter of the cylinder liner is comprised of nodular/ductile iron and vermicular iron. The ductile iron is quite strong and resistant to fatigue, cracking and breaking. The inner diameter of the cylinder liner, which is the wearing surface of the liner, is comprised of a flake or gray iron and vermicular iron. The gray iron exhibits good wear & scuff-resistant qualities, which are necessary qualities particularly for the inner diameter of the cylinder liner.

In a preferred embodiment, the cylinder liner has a gradual transition from ductile and vermicular iron on the outer diameter for improved strength and fatigue resistance, to gray and vermicular iron on the inner diameter for improved wear resistance. The transition region between the outer diameter and inner diameter is comprised of vermicular iron. The amount of ductile iron used in the liner as compared to the amount of gray iron used may vary depending on the specific application and need. For example, as strength requirements increase, the amount of ductile iron that is used will be increased as well.

The present invention is also directed to a method of making a cylinder liner for use in an internal combustion engine. In a first embodiment, a predetermined amount of a magnesium bearing material is placed into a centrifugal die. A gray base iron is then added to the centrifugal die. The magnesium iron gray bearing material is then spun until solidification is complete, forming the cylinder liner defined above.

In a second embodiment, a predetermined amount of a magnesium alloy such as MgFeSi or NiMg bearing material is placed into a spinner ladle. The magnesium bearing material reacts with the base gray iron poured into the spinner ladle. As a result of the reaction, at least a portion of the gray iron is converted to a composition of nodular iron and vermicular iron. The iron compound is then spun to form the cylinder liner defined above.

The magnesium bearing material is preferably a magnesium bearing alloy. Either method can include the additional step of induction hardening the inner diameter. The inner diameter is preferably induction hardened to a Rockwell "C" ($R_c$) hardness of between about 40 and about 50.

The cylinder liner, as defined above and as produced according to the methods described above, includes vermicular iron at a transition region positioned between the outer diameter and the inner diameter, at a greater concentration than at any region approaching either the inner diameter or the outer diameter.

The invention provides a number of advantages. In particular, tensile strength of the dual phase cylinder liner is significantly greater than the tensile strength of known cylinder liners. Cracking and breaking at the liner transition points are reduced. Moreover, the cylinder liner is produced more cost-effectively than known liners such as coated, reinforced, heat-treated, and roll-burnished liners.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
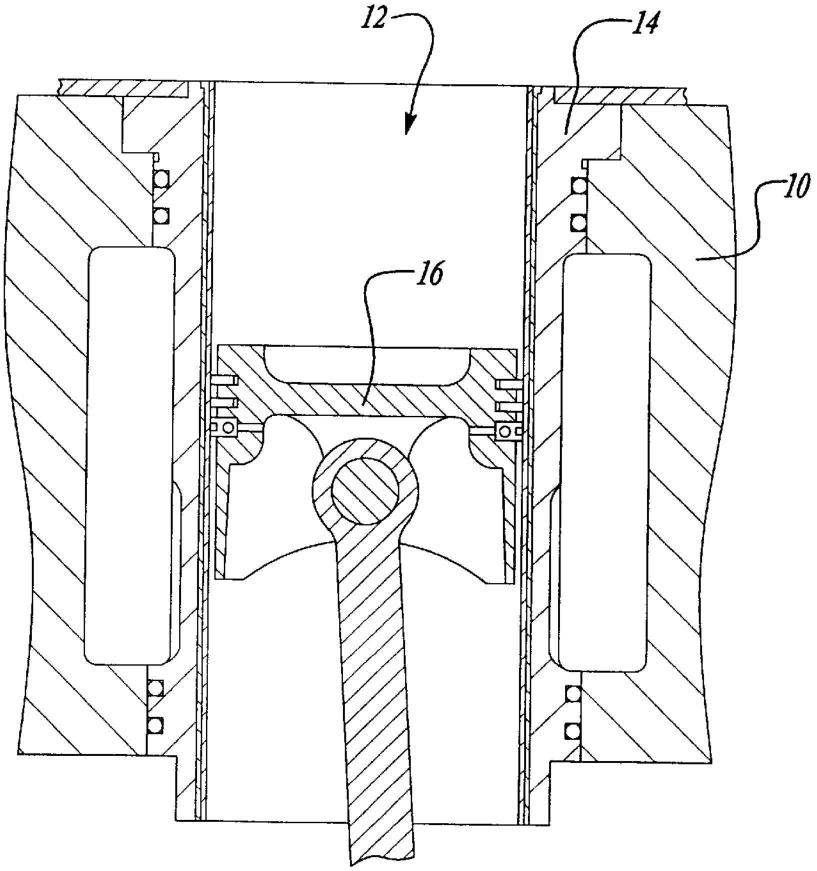
FIG. 1 is a cross-sectional view of part of an internal combustion engine including a cylinder liner of the present invention.

As shown in FIG. 1, a cylinder block 10 of an engine has a bore 12 wherein a cylinder liner 14 may be inserted or cast. Cylinder liner 14 is adapted to receive a piston 16 that moves reciprocatingly through cylinder liner 14. Cylinder liner 14 is subjected to great stresses including heat and friction that may cause cylinder liner 14 to wear, crack or break. Thus, it is important that cylinder liner 14 be strong, yet not too thick or heavy.

Figure 2:
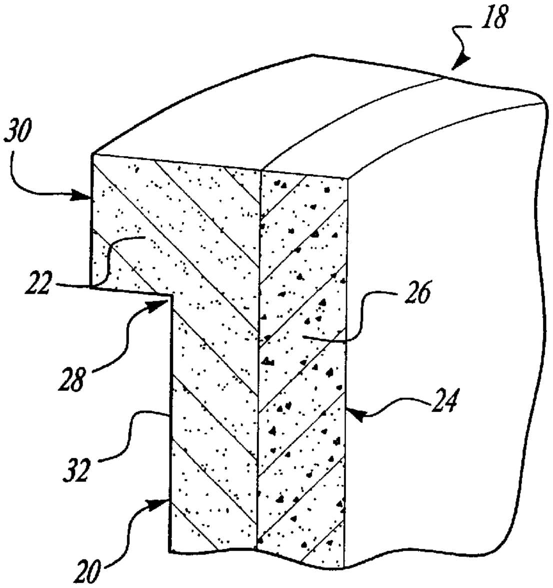
FIG. 2 is a cross-sectional view of a dual phase cylinder liner of the present invention.

As more clearly shown in FIG. 2, resistance to wearing, cracking and breaking of cylinder liner 14 is accomplished by a dual-phase graphite morphology 18 of cylinder liner 14. Generally, cylinder liner 14 is about ⅜ inch or 9.5 mm thick. Cylinder liner 14 has an outer diameter 20 comprised of ductile iron and vermicular iron 22 and an inner diameter 24 comprised of gray iron and vermicular iron 26. The thickness of outer diameter 20 and inner diameter 24 varies depending on the particular applications and needs. Inner diameter 24 is preferably from about 1/1000 inch or 0.0254 mm to 1/100 or 0.254 mm inch thick.

Ductile iron (also known as nodular iron) of outer diameter 20 is very strong and resistant to cracking and breaking. Gray iron (also known as flake graphite) of inner diameter 24 is a flake iron that is resistant to wearing and scuffing from reciprocating piston 16. Thus, cylinder liner 14 is very strong due to outer diameter 20 of ductile iron, yet resistant to wearing due to inner diameter 24 of gray iron, which is in direct contact with reciprocating piston rings 16.

Figure 3:
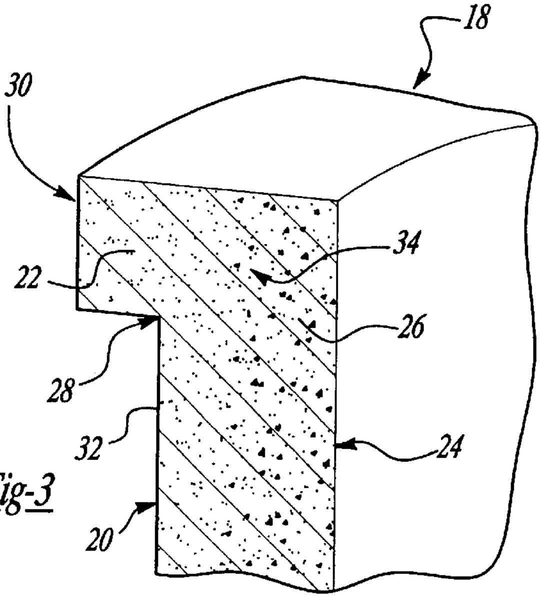
FIG. 3 is a cross-sectional view of a dual phase cylinder liner of the present invention including a transition region.

As shown in FIG. 3, preferably there is a gradual transition from outer diameter 20 of cylinder liner 14 to inner diameter 24 of cylinder liner 14, forming a transition region 34 positioned therebetween. Transition region 34 is comprised of vermicular iron.

Cylinder liner 14 of the present invention is resistant to wearing, cracking and breaking, especially at a transition point 28 (also known as a notch) as shown in FIGS. 2 and 3. Transition point 28 represents a comer transition of cylinder liner 14. Specifically, transition point 28 of cylinder liner 14 as shown in FIG. 2 is a corner transition between flange 30 of cylinder liner 14 and wall 32 of cylinder liner 14.

Cylinder liner 14 of the present invention, i.e., having a dual-phase graphite structure, may be manufactured by various methods. One method is to alter the microstructure of iron. For example, cylinder liner 14 may be manufactured by adding a weighted amount of an inoculating material such as a magnesium bearing material to a spinner ladle. Gray iron is then poured into the spinner ladle where it is combined with the magnesium bearing material. In the ladle, a controlled reaction occurs where the flake graphite type iron is converted to a composition of nodular iron and vermicular iron. The materials and the reaction conditions are performed under conditions whereby the sulfur content of the iron is controlled.

A spinning die is pretreated by coating the die with a refractory mold release. The iron produced from the reaction in the spinner ladle is then introduced into the spinning die. The iron is spun in the spinning die until the solidification process is complete. The centrifugal casting process is novel, and is an exceptionally advantageous method of providing the iron of the present invention, including the transition of graphite forms across the solidifying wall of cylinder liner 14, since solidification is directional-starting at the outer diameter 20 and completing at the inner diameter 24 as shown in FIG. 3.

A second method has similarities to the first method described above. A weighted amount of a magnesium bearing material is uniformly placed inside a centrifugal die. The centrifugal die has been pretreated by coating the die with a refractory mold release. Gray iron that has controlled sulfur content is then Introduced into the centrifugal die and reacts with the magnesium bearing material. The treated iron is then spun in the centrifugal die until the solidification process is complete. Either of these two methods produces a solidified composition from which a cylinder liner 14 with a dual graphite structure is then produced as shown in FIG. 3.

The magnesium bearing material can be elemental magnesium. However, it is also advantageous to select from among magnesium bearing alloys, or rare earth metals and their alloys known in the art of forming ductile iron.

As an alternative method to the two methods described above, ductile iron is cast inside a die. At the point when the ductile iron begins to solidify, gray iron is added. The gray iron will bond to the ductile iron to form a cylinder liner having an outer diameter of ductile iron and inner diameter of gray iron. While it is common in the art to pour different types of iron to cast metals having a dual mold, the present dual graphite structure is novel, especially when used as the cylinder liner 14 of the present invention. Either liner 14 has a flake type graphite constitution at the inner diameter 24. The inner diameter can be induction hardened until the Rockwell "C" ($R_c$) hardness is between about 40 and about 50 to further improve the liners wear resistance properties of the liner.

The disclosed embodiments and examples are given to illustrate the present invention. However, they are not meant to limit the scope and spirit of the present invention. Therefore, the present invention should be limited only by the appended claims.

What is claimed is:

1. A method of making a cylinder liner for use in an internal combustion engine, comprising the steps of:

placing a predetermined amount of a magnesium bearing material into a centrifugal die;

adding gray iron to said centrifugal die;

forming a solidified composition by spinning said gray iron and said magnesium bearing material; and forming said cylinder liner from said solidified composition, said cylinder liner having an outer diameter of ductile iron and vermicular iron, and an inner diameter of predominantly gray iron.

2. The method of claim 1 wherein said magnesium bearing material is elemental magnesium.

3. The method of claim 1, wherein said vermicular iron is present, at a transition region positioned between said outer diameter and said inner diameter, at a greater concentration than at any region approaching either said inner diameter or said outer diameter.

4. The method of claim 1, which further comprises coating said centrifugal die with a refractory mold release prior to placing said magnesium bearing material into said centrifugal die.

5. The method of claim 1, which further comprises induction hardening said inner diameter.

6. The method of claim 5, wherein said inner diameter is induction hardened to an $R_c$ of between about 40 and about 50.

7. A method of making a cylinder liner for use in an internal combustion engine, comprising the steps of:

placing a predetermined amount of a magnesium bearing material into a spinner ladle;

reacting said magnesium bearing material with a gray iron in said spinner ladle, said reacting step converting at least a portion of said gray iron to a structure of nodular iron and vermicular iron;

forming a solidified composition by spinning said iron compound forming said cylinder liner from said solidified composition, said cylinder liner having an outer diameter of ductile iron and vermicular iron, and an inner diameter of predominantly gray iron.

8. The method of claim 7, wherein said magnesium bearing material is magnesium.

9. The method of claim 7, wherein said vermicular iron is present, at a transition region positioned between said outer diameter and said inner diameter, at a greater concentration than at any region approaching either said inner diameter or said outer diameter.

10. The method of claim 7, which further comprises induction hardening said inner diameter.

11. The method of claim 10, wherein said inner diameter is induction hardened to a Rockwell "C" hardness of between about 40 and about 50.

12. A method of making a cylinder liner for use in an internal combustion engine, said cylinder liner having an outer diameter of ductile iron and vermicular iron, and an inner diameter of gray iron and vermicular iron, the method comprising the steps of:

casting ductile iron inside a centrifugal die; and adding and bonding gray iron to said ductile iron.

13. The method of claim 1, wherein said cylinder liner is about ⅜ inch thick after said step of forming said cylinder liner.

14. The method of claim 1, wherein said inner diameter is about 1/1000 inch thick after said step of forming said cylinder liner.

15. The method of claim 1, wherein said inner diameter is between about 1/1000 inch and 1/100 inch thickness after said step of forming said cylinder liner.

16. The method of claim 7, wherein said cylinder liner is about ⅜ inch thick after said step of forming said cylinder liner.

17. The method of claim 7, wherein said inner diameter is about 1/1000 inch thick after said step of forming said cylinder liner.

18. The method of claim 1, wherein said inner diameter is between about 1/1000 inch and 1/100 inch thickness after said step of forming said cylinder liner.

19. The method of claim 12, wherein said cylinder liner has an outer diameter of ductile iron and vermicular iron.

20. The method of claim 12, wherein said cylinder liner has an inner diameter of predominantly gray iron, and vermicular iron is present at a transition region positioned between, but not including, an inner diameter and an outer diameter, a concentration of said vermicular iron at said transition region being at a maximum relative to any region approaching either said inner diameter and said outer diameter.

* * * * *